United States Patent
Hardy et al.

(10) Patent No.: US 8,450,640 B2
(45) Date of Patent: May 28, 2013

(54) PANEL WITH MICRO-HOLE PATTERN IN A STRUCTURALLY THIN PORTION

(75) Inventors: Gregg E. Hardy, Portland, OR (US); Michael S. Nashner, Portland, OR (US); Jeffrey Howerton, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 42 days.

(21) Appl. No.: 13/114,607

(22) Filed: May 24, 2011

(65) Prior Publication Data

US 2011/0222298 A1     Sep. 15, 2011

Related U.S. Application Data

(62) Division of application No. 11/742,879, filed on May 1, 2007, now Pat. No. 7,968,820.

(60) Provisional application No. 60/810,380, filed on Jun. 2, 2006, provisional application No. 60/852,592, filed on Oct. 18, 2006.

(51) Int. Cl.
*B23K 26/00* (2006.01)
*B29D 11/00* (2006.01)

(52) U.S. Cl.
USPC .................................. 219/121.71; 264/1.37

(58) Field of Classification Search
USPC ............... 219/121.6, 121.7, 121.71; 264/400; 362/362–367; 428/131, 690; 40/564, 579
See application file for complete search history.

(56) References Cited

U.S. PATENT DOCUMENTS

| | | | |
|---|---|---|---|
| 4,155,972 A | | 5/1979 | Hauser et al. |
| 4,791,746 A | * | 12/1988 | Coronato ................... 40/547 |
| 5,951,349 A | | 9/1999 | Larose et al. |
| 6,211,485 B1 | | 4/2001 | Burgess |
| 6,416,844 B1 | | 7/2002 | Robson |
| 7,663,612 B2 | | 2/2010 | Bladt |
| 2002/0170891 A1 | | 11/2002 | Boyle et al. |
| 2005/0127478 A1 | | 6/2005 | Hiatt et al. |

FOREIGN PATENT DOCUMENTS

| | | |
|---|---|---|
| JP | 2-89740 U | 7/1990 |
| JP | 07-016778 | 1/1995 |
| JP | 07-201260 | 8/1995 |
| JP | 07-271309 | 10/1995 |
| JP | 08-298043 | 11/1996 |
| JP | 11-168281 | 6/1999 |
| JP | 2003-248445 | 9/2003 |
| JP | 2004-104079 | 4/2004 |
| JP | 2005-066687 A | 3/2005 |
| JP | 2005-507318 A | 3/2005 |
| JP | 2006-062431 A | 3/2006 |
| WO | 2004/077388 A1 | 9/2004 |
| WO | 2005/110666 A1 | 11/2005 |

* cited by examiner

*Primary Examiner* — Sang Paik
(74) *Attorney, Agent, or Firm* — Young Basile

(57) ABSTRACT

An area of reduced thickness is formed in a panel, and a pattern of microscopic holes are formed in the area. The holes are filled with a light transmissive material such as a curable polymer. The thinned area may also be filled with a polymer to reinforce the thinned area and the polymer may be colored to add color to light transmitted through the pattern. The panel can form a portion of a housing surrounding a lighting source that makes the holes visible when lit.

10 Claims, 4 Drawing Sheets

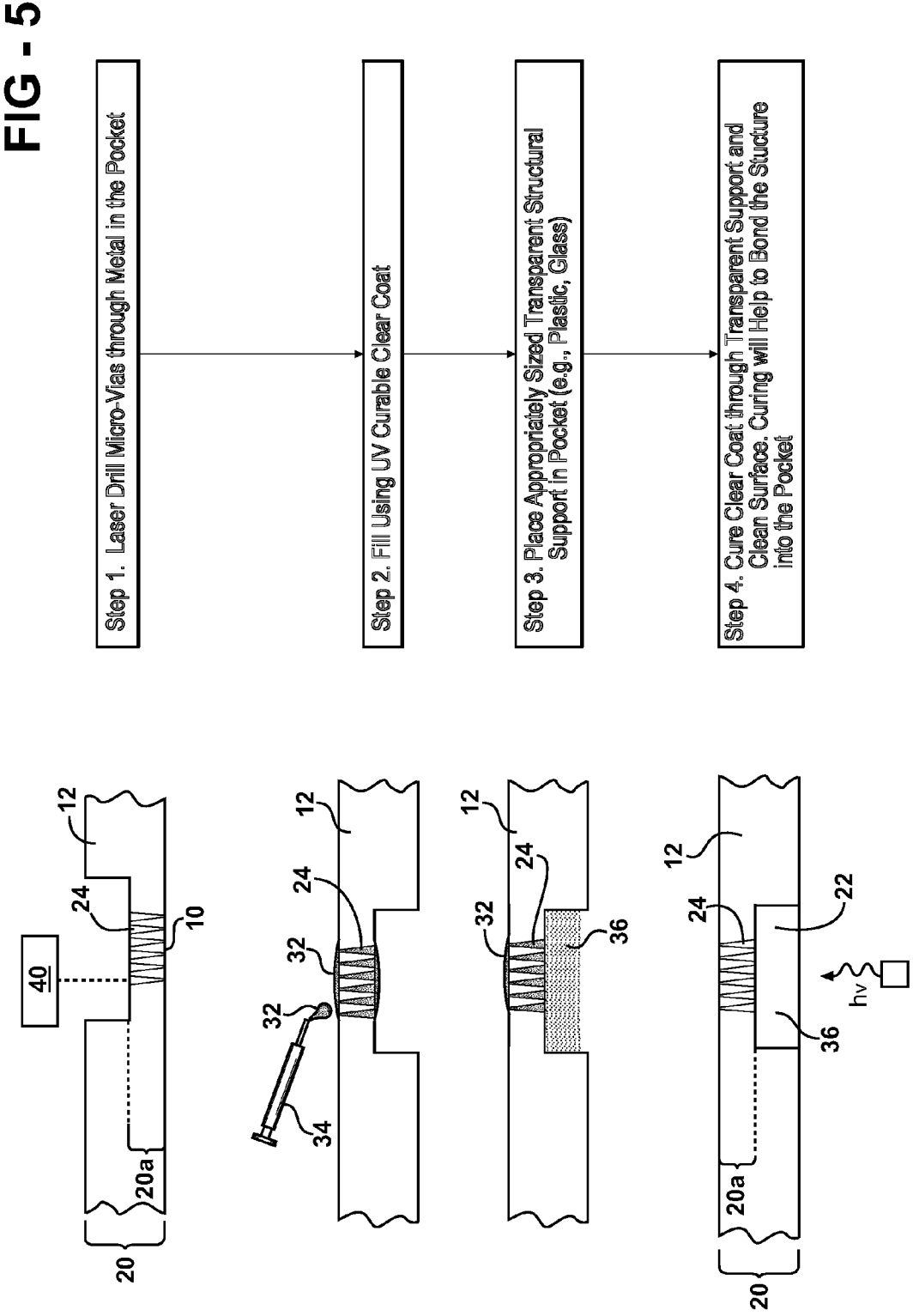

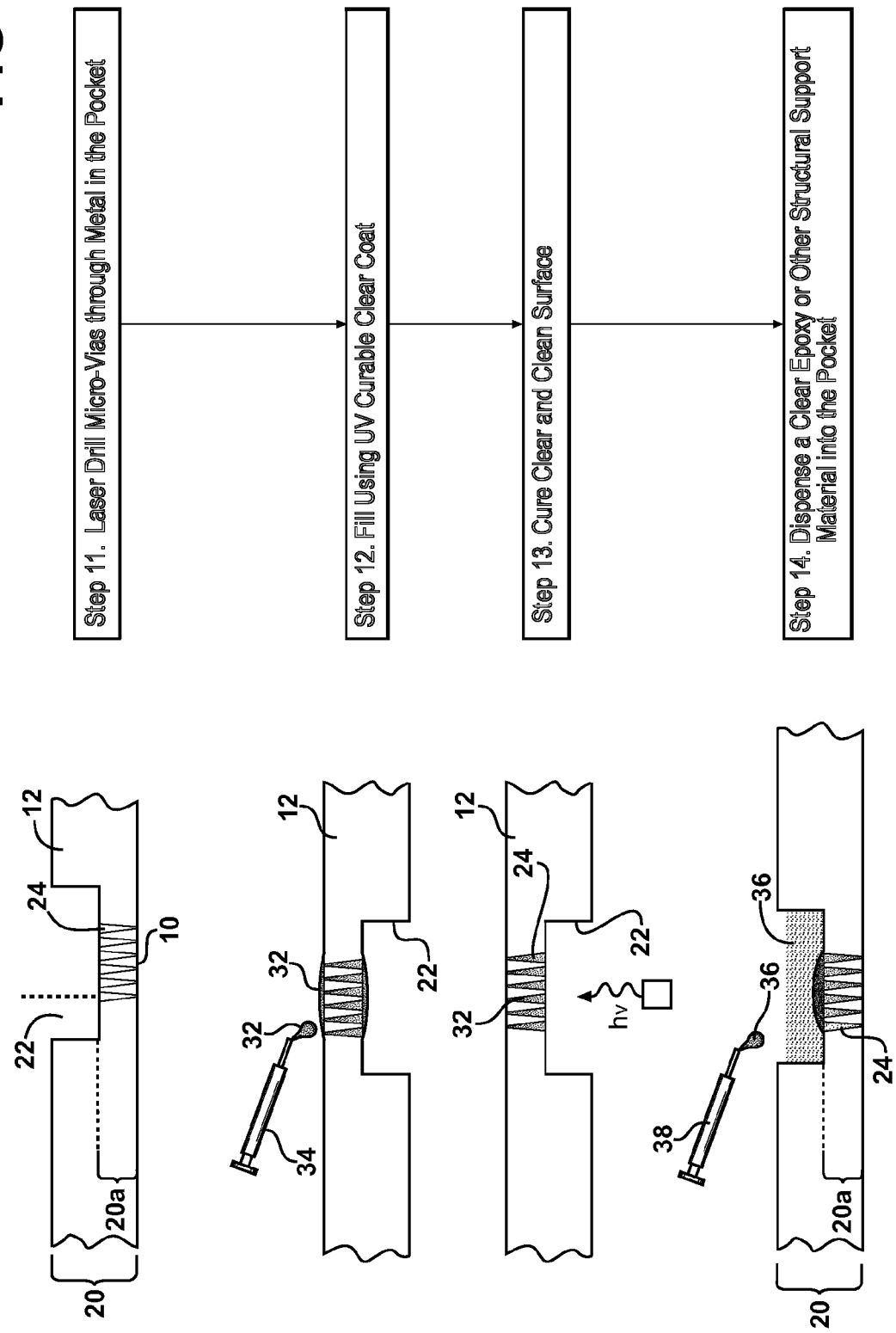

PANEL WITH MICRO-HOLE PATTERN IN A STRUCTURALLY THIN PORTION

CROSS-REFERENCE TO RELATED APPLICATIONS

This application is a divisional of U.S. application Ser. No. 11/742,879, which claims the benefit under 35 U.S.C. §119(e) of U.S. provisional application Nos. 60/810,380, filed Jun. 2, 2006, and 60/852,592, filed Oct. 18, 2006, each of which is incorporated herein in its entirety by reference.

FIELD OF THE DISCLOSURE

The field of the technical subject matter relates to a a thin substrate in which patterns are drilled and/or a structurally reinforced, thinned substrate having a via pattern after drilling.

BACKGROUND

Projecting a light through a housing or panel to provide information is commonplace. Examples include but are not limited to computer keyboards that include indication lights for functions such as "Caps Lock" or "Num Lock"; computer monitors that include an "on/off" light, automobiles that include lights to indicate whether heated seats are on or off, or whether an air bag is on or off; televisions with indicator lights, and a whole host of other consumer electronics.

A common way to provide for such lighting is to provide a projecting light that is visible when the light is off, and brightly lit to indicate when it is on. A collection of lights, or holes for lights, may be disruptive to the objectives of an industrial designer.

SUMMARY

Disclosed are methods for improving light transmission and laser drill throughput by thinning a substrate or panel without substantially reducing the strength and durability of the panel having through-hole vias.

One method of filling a via in a panel with an optically transmissive material taught herein comprises forming a pocket in the panel where the pocket has a second thickness. The second thickness is less than the first thickness of the panel. The method in this example further includes drilling at least one via in the pocket and filling the via with an optically transmissive material.

Products formed by the method are also described herein. One example of such a product, a panel by example, has a first thickness and includes a section having a second thickness wherein the second thickness is less than the first thickness. The panel further includes a light transmissive section formed in that section of the panel having the second thickness wherein the light transmissive section is formed by at least one via filled with an optically transmissive material.

Details of these aspects and other inventive features of the disclosure are discussed below with reference to the drawing figures.

BRIEF DESCRIPTION OF THE DRAWINGS

The description herein makes reference to the accompanying drawings wherein like reference numerals refer to like parts throughout the several views, and wherein:

FIG. 5 is a schematic representation of the sequence of method steps of a panel having a thinned pocket area reinforced by a solid reinforcing material; and FIG. 6 is a schematic representation of the sequence of method steps of a panel having a thinned pocket area reinforced by a liquid reinforcing material.

DETAILED DESCRIPTION OF EMBODIMENTS OF THE INVENTION

Figure 1A:
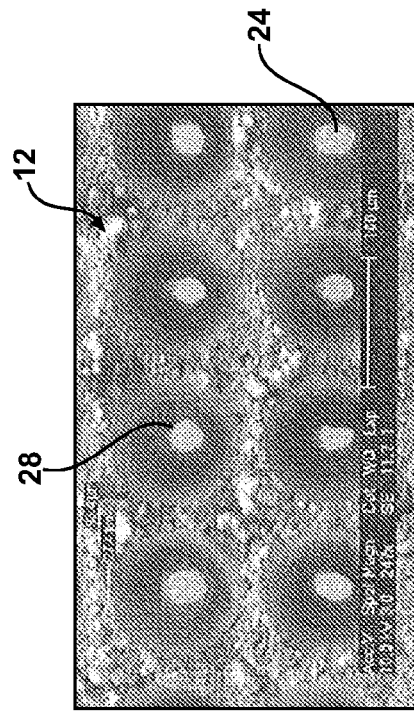
FIG. 1 is a schematic representation of a via geometry and the micrographs of the array of vias taken from the back or drill surface in FIG. 1A and from the front or exit surface in FIG. 1B.
Figure 1B:
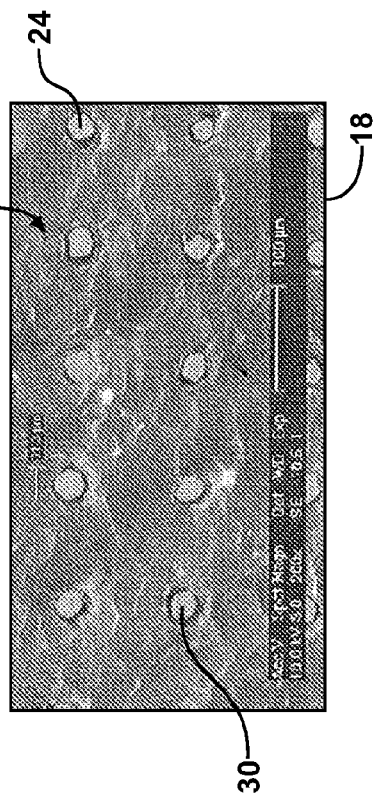
Figure 1:
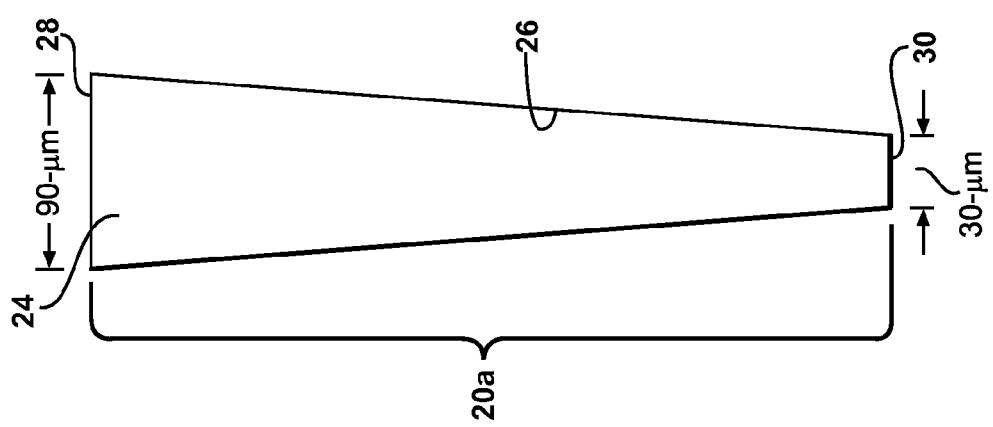
Figure 2:
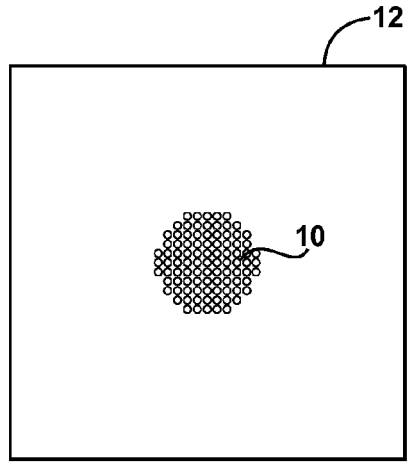
FIG. 2 is a schematic representation of an application where the vias are drilled through a panel having a standard thickness of about 400μm.
Figure 3:
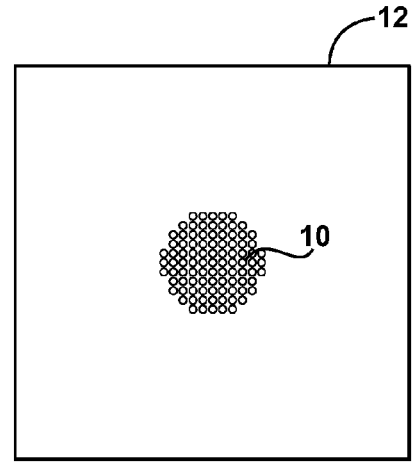
FIG. 3 is a schematic representation of an application where the vias are drilled through a panel having a thinner thickness of about 100μm.
Figure 2A:
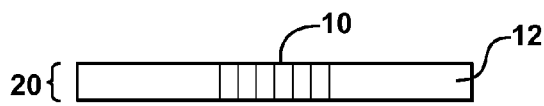
Figure 3A:
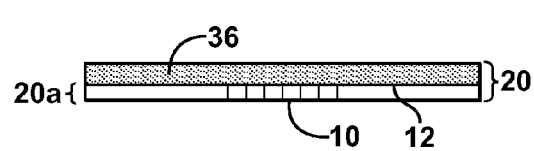
Figure 4:
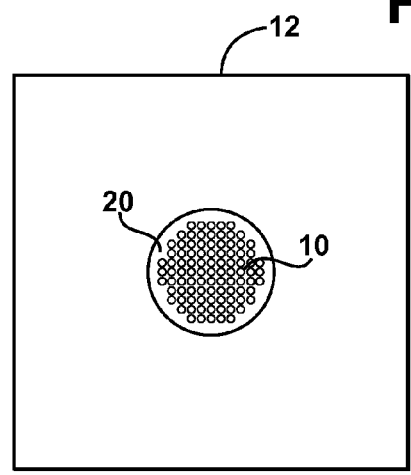
FIG. 4 is a schematic representation of an application where the vias are drilled inside a thinned pocket area of a panel.
Figure 4A:
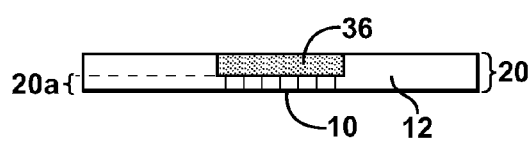

A thinned substrate or panel having through-hole vias (also called micro-vias herein due to their relatively small size) made according to methods taught herein is shown in FIG. 1. The panel can be thinned using standard machining or the panel can be provided having a section including a reduced thickness. The panel may incorporate a micro-via pattern array 10 in a substrate surface as shown in FIG. 2. After a micro-via pattern array 10 is drilled in the panel 12, a transparent or translucent material filler 32 may be applied to the drilled micro-vias. Then, a material having transparent or translucent and strengthening properties can be applied to the drilled micro-via panel surface to reinforce the strength of the thinned panel as shown in FIGS. 3 and 4. The reinforcing material 36 could either be a solid that is bonded to the drilled surface or a liquid or viscous substance that cures to form a solid. The reinforcing material may also be used to color, diffuse, or apply lens effects or other artistic lighting effects in applications where lighted patterns are intended to be created with the micro-vias.

Referring to FIGS. 3-6 a method for reinforcing a thin panel 12 having via 10 with a light transmissive material and a product made from using the method is shown and described below. The method and steps for structurally reinforcing a thin panel having via with light transmissive material is illustrated in FIGS. 5 and 6. A substrate or panel 12 is provided. Panel 12 is a relatively thin continuous sheet of material such as anodized aluminum. Panel 12 includes a first or drill surface 14 and an opposing second or exit surface 18 defining a panel thickness 20. Typically, when the panel is aluminum, the panel 12 should be about 400 micrometers (μm) thick in order for the panel 12 to retain its structural integrity after the via array 10 has been drilled in the panel drill surface 14. In an example of the present invention, the aluminum panel 12 provided has a thin thickness 20a, that is a thickness of less than 400 micrometers (μm), as shown in FIG. 3. Alternatively, where an aluminum panel 12 having a thickness 20 of about 400 micrometers (μm) is provided, a portion of the panel 12 can be thinned on the drill surface 14 to a thinner thickness 20a as shown in FIG. 4.

In an application where an aluminum panel 12 having a thickness of 400 micrometers (μm) is provided, the method includes thinning a pocket area 22 on the drill surface 14 to a thinner thickness 20a of about 100 micrometers (μm). As shown in FIG. 4, the thinned pocket area 22 can be machined using a bore or other machined device. The size of the thinned pocket area 22 should be large enough to accommodate the desired via array pattern 10. The thinned pocket area 22 is shown in FIG. 4 as a having a circular shape, but it is understood that the thinned pocket area 22 can be of other shapes and configurations. The thinned area 22 of the panel 12 improves light transmission and reduces the laser drill time of the vias.

In one application of the method shown in FIG. 5, act (referred hereafter as S) 1 includes drilling one or a plurality of micro-vias or holes 24 through the thinned panel 12. As shown in FIG. 1, in one aspect, the vias 24 are conical-shaped having sidewalls 26 and a first opening 28 in panel drill surface 14 and an opposing second opening 30 on panel exit surface 18. First via opening 28 is larger in diameter than second via opening 30. For example where the panel 12 is aluminum, first via opening 28 is approximately 90-100 micrometers (μm) in diameter and second via opening 30 is approximately 30-40 micrometers (μm) in diameter, as shown in FIGS. 1A and 1B. It is understood that larger or smaller openings and other via shapes and configurations may be used. The vias 24 in FIGS. 1A and 1B are drilled or machined out of the panel using a laser, such as a diode-pumped solid-state pulsed laser 40 in a circular or spiral pattern.

Optionally, cleaning the drilled vias 24 to remove any debris or deposits formed during the machining process can be performed. It has been shown that a $CO_2$ snow jet cleaning and isopropyl are effective in cleaning the vias. Other via cleaning techniques known by those skilled in the art may also be used. Ultrasonic cleaning using, for example, ultrasonic baths may be used. Also, the application of high-pressure air, like the snow jet, may be made from a source movably located in a similar manner to the drill 40 to clean the vias.

In S2 shown in FIG. 5, the disclosed method can include applying a filler material coating 32 into the vias 24. The filler material 32 may be a visible light transmissive material. The exemplary UV curable filler material 32 is substantially clear when cured. As best seen in FIG. 1, the filler material 32 is applied to the panel second surface 18 over the top of the second or smaller openings 30 of vias 24, filling the vias 24 as shown in FIG. 5. The filler material 32 as shown is applied with a syringe-type device 34. Although, the step of filling the micro-vias is shown in FIG. 5, the method can proceed to S3 without filling the micro-vias with filler material 32.

Referring to FIG. 5 in S3, a reinforcing material 36 is applied to the thin panel 12. The reinforcing material 36 having transparent or translucent properties is applied to the drilled micro-via panel surface 14 to reinforce the strength of the thinned panel 12. As shown in FIG. 5, the reinforcing material 36 can be a solid preformed and/or pre-cured material having transparent or translucent properties, such as plastic or glass. A solid transparent reinforcing material 36 of the appropriate size is applied to the thin panel as shown in FIG. 3 or to the thinned pocket area 22 of a panel as shown in FIGS. 4 and 5. The reinforcing material 36 provides the panel 12 with the structural support integrity of a panel having a normal thickness, for aluminum that of 400 micrometers (μm).

If the vias have been filled in S2 and/or if the reinforcing material 36 is not pre-cured, the method may proceed to S4 where preferably a UV clear filler 32 and/or the reinforcing material 36 is then cured by exposing the filler material 32 to UV light through the transparent reinforcing material 36. When cured, the filler material 32 is optically transparent permitting passage of visible light through the filler material 32, the reinforcing material 36, and panel 12 through vias 24.

The curing of the UV clear filler material 32 bonds the reinforcing material 36 to the panel 12.

In another example, the method shown in FIG. 6 includes drilling one or a plurality of micro-vias 24 through the thinned panel 12 in S11. As shown in FIG. 1, the vias 24 are conical-shaped having sidewalls 26 and a first opening 28 in panel first surface 14 and an opposing second opening 30 on second surface 18 as described above. It is understood that larger or smaller openings and other via shapes and configurations may be used. The drilled vias 24 can be cleaned to remove any debris or deposits formed during the machining process.

The filler material 32 may be a visible light transmissive material. The exemplary UV curable filler material 32 is substantially clear when cured. Filler material 32 also may have better transmission of audible sound through the filler material 32 than transmission of audible sound through panel 12 thickness 20. As best seen in FIG. 1, the filler material 32 is applied to the panel second surface 18 over the top of the second or smaller openings 30 of vias 24, filling the vias 24 as shown in FIG. 5. The filler material 32 as shown is applied with a syringe-type device 34. Although, the step of filling the micro-vias is shown in FIG. 5, the method can proceed to S3 without filling the micro-vias with filler material 32.

In S12 shown in FIG. 6, the disclosed method can include applying a liquid filler material coating 32, such as a clear UV curable epoxy, into the vias 24. As shown in FIG. 6, the filler material 32 is applied to the panel second surface 18 over the top of the second or smaller openings 30 of vias 24 with a syringe-type device 34. Other filler material 32 application devices and techniques known by those skilled in the art may be used. For example, a thin material film, rather than a curable liquid filler material, can be applied to the drill surface 12 of the aluminum panel 12, resulting in essentially unfilled vias.

If a liquid curable filler material 32 is applied to the micro-vias 24, the method proceeds to S13, where the filler material 32 is then cured by exposing the filler material 32 to UV light. Any excess or uncured filler material is removed from the panel 12. If necessary, the method may also include additional curing after the excess filler material is removed by, for example, a simple isopropanol wipe.

In S14, a reinforcing material 36 is applied to the thinned pocket area 22 of the panel as shown in FIGS. 4 and 6. The reinforcing material 36 can be a liquid or viscous material that cures to form a solid material. A liquid transparent reinforcing material, such a clear epoxy or other reinforcing material provides structural support to the thinned panel area. The reinforcing material 36 as shown is applied with a syringe-type device 38. Other application devices and techniques known by those skilled in the art may be used. The reinforcing material 36, when cured provides the panel with a uniform structural integrity like that of a panel having a conventional thickness.

The use of vias 24 and an optically transparent reinforcing material 36 and/or filler material 32 produces a smooth and continuous surface to the naked eye that is capable of displaying controlled images through the vias from interior illumination. The resultant panel 12 can be used in all manner of application. The disclosed method and resultant panel is applicable in virtually all applications where a visually continuous and uninterrupted surface is desired having the capability to produce illuminated messages, images or other perceptible characteristics for the user.

For example, the substrate 12 of FIGS. 3 and 4 is in the form of a panel. The panel 12 can be incorporated in a conventional housing as previously discussed or can be integral with a housing. When the panel 12, as part of a housing, is back lit with an LED, fluorescent or incandescent light, or other lighting device, the light emitted from the vias forms a pattern visible to the viewer.

In another example, the panel can be thinned in a small area without application of a reinforcing material to the thinned area. In this example, thinning the small area of the panel should not reduce the structural strength of the panel, obviating the need for a reinforcing material. The size of the thinned area possible in the panel in order maintain the structural integrity of the panel as a whole is dependent on the density of the drilled micro-via array, the strength of the panel material, and/or the shape of the drilled vias, etc.

While the method has been described in connection with what is presently considered to be the most practical and preferred embodiments, it is to be understood that the method is not to be limited to the disclosed embodiments but, on the contrary, is intended to cover various modifications and equivalent steps and arrangements included within the spirit and scope of the invention and any appended claims.

What is claimed is:

1. A panel having light transmissive area formed therein comprising:
   a panel of material that is essentially non-transmissive to light;
   an area of reduced thickness in the panel;
   a pattern of substantially invisible micro-holes laser drilled through the area of reduced thickness wherein the holes fully penetrate through the area of reduced thickness in the panel from one surface to the other; and
   a light transmissive material filling the holes.

2. The panel of claim 1 wherein the light transmissive material is a cured polymeric material.

3. The panel of claim 1 wherein the light transmissive material also at least partially fills the area of reduced thickness and structurally reinforces the panel in said area.

4. The panel of claim 1 formed into a housing surrounding a light source.

5. The panel of claim 1 wherein the micro-holes are substantially conical holes, a smaller end of each conical hole having a diameter on the order of between 10 and 50 µm and a diameter of a larger end of each conical hole being between about 60 and 200 µm.

6. The panel of claim 5 formed into a housing surrounding a light source, the larger end of each conical hole facing the light source.

7. A panel of generally opaque material formed in a localized portion thereof which is of a thickness less than that of the surrounding area of the panel, a pattern of light transmissive holes extending fully through the reduced thickness area from one surface to the other and of such size as to be substantially invisible to the naked eye when viewed from at least one surface of the panel.

8. The panel described in claim 7 wherein the holes are substantially conical and are filled with a light transmissive material.

9. The panel of claim 8 wherein the light transmissive material is a cured polymer.

10. The panel of claim 8 wherein the smaller end of each conical hole has a diameter on the order of between 10 and 50 µm and the diameter of the larger end of each conical hole is between about 60 and 200 µm.

* * * * *